(12) United States Patent
Lindskov et al.

(10) Patent No.: US 9,402,370 B2
(45) Date of Patent: Aug. 2, 2016

(54) FOOD RETAINER FOR A DOMESTIC ANIMAL

(71) Applicant: NORTHMATE APS, Arslev (DK)

(72) Inventors: Frederik Estrup Lindskov, Tikob (DK); Mikkel Hansen, Copenhagen (DK)

(73) Assignee: Northmate ApS, Årslev (DK)

( * ) Notice: Subject to any disclaimer, the term of this patent is extended or adjusted under 35 U.S.C. 154(b) by 0 days.

(21) Appl. No.: 14/394,452

(22) PCT Filed: Apr. 17, 2013

(86) PCT No.: PCT/DK2013/050109
§ 371 (c)(1),
(2) Date: Oct. 14, 2014

(87) PCT Pub. No.: WO2013/156033
PCT Pub. Date: Oct. 24, 2013

(65) Prior Publication Data
US 2015/0068461 A1    Mar. 12, 2015

(30) Foreign Application Priority Data

Apr. 18, 2012   (DK) .................................. 2012 70199

(51) Int. Cl.
*A01K 5/00*   (2006.01)
*A01K 5/01*   (2006.01)

(52) U.S. Cl.
CPC ................. *A01K 5/00* (2013.01); *A01K 5/0114* (2013.01); *A01K 5/0135* (2013.01)

(58) Field of Classification Search
CPC ... A01K 5/0114; A01K 5/0135; A01K 7/005; A47G 7/03
USPC .............................................. 119/61.5, 61.54
See application file for complete search history.

(56) References Cited

U.S. PATENT DOCUMENTS

| | | | | |
|---|---|---|---|---|
| 472,316 | A | * | 4/1892 | Smith ...................... A01K 5/01 119/61.1 |
| 3,048,942 | A | * | 8/1962 | Boetticher ............... A47G 7/03 47/41.13 |
| D243,313 | S | * | 2/1977 | Varnado ......................... D32/58 |

(Continued)

FOREIGN PATENT DOCUMENTS

| | | |
|---|---|---|
| CH | 701865 A1 | 3/2011 |
| EP | 2145534 A2 | 1/2010 |

(Continued)

OTHER PUBLICATIONS

International Search Report and Written Opinion, PCT/DK2013/050109, mailed Jul. 16, 2013.

*Primary Examiner* — Kristen C Hayes
(74) *Attorney, Agent, or Firm* — Winston & Strawn LLP

(57) ABSTRACT

A food retainer adapted to receive food to be eaten by a domestic animal. The food retainer has a base and a number of protrusions extending from the upper surface of the base of the food retainer in mutual distances from each other. At least some of the protrusions are substantially higher than the remainder of those on the food retainer. The structure of the food retainer forces the animal to struggle for the food, thereby performing an exercise that keeps the animal healthy and active and stimulates the intelligence and physique of the animal.

15 Claims, 4 Drawing Sheets

(56) References Cited

U.S. PATENT DOCUMENTS

| | | | | |
|---|---|---|---|---|
| D279,945 S | * | 8/1985 | Zeischegg | D6/672 |
| 5,492,237 A | * | 2/1996 | Chang | A47L 19/04 211/118 |
| D376,559 S | * | 12/1996 | Elsea | D11/147 |
| 6,038,784 A | * | 3/2000 | Dunn | A47L 19/04 211/41.6 |
| 6,125,548 A | * | 10/2000 | Dunn | F26B 25/18 211/41.6 |
| D460,295 S | * | 7/2002 | Fissell | D32/58 |
| D477,171 S | * | 7/2003 | Gabbour | D6/582 |
| 6,675,493 B1 | * | 1/2004 | Martin | F26B 25/18 248/95 |
| D488,603 S | * | 4/2004 | Bardenhagen-Shuster | D32/58 |
| D563,608 S | * | 3/2008 | Kitchen | D30/129 |
| 7,344,036 B2 | * | 3/2008 | Jerstroem | A47L 19/04 211/184 |
| 7,458,470 B2 | * | 12/2008 | Jerstroem | A47L 19/04 211/41.4 |
| D603,657 S | * | 11/2009 | Tu | D7/622 |
| D610,265 S | * | 2/2010 | Lea | D24/227 |
| 7,669,721 B2 | * | 3/2010 | Kemper | A47L 19/04 211/126.1 |
| D634,909 S | * | 3/2011 | Guthrie | D32/55 |
| 7,895,975 B2 | * | 3/2011 | Markham | A01K 5/0114 119/61.5 |
| D645,274 S | * | 9/2011 | Terada | D6/682.6 |
| 8,534,225 B2 | * | 9/2013 | Vermeegen | A01K 5/0114 119/421 |
| D697,741 S | * | 1/2014 | Musheyev | D6/677.5 |
| D706,001 S | * | 5/2014 | Hansen | D30/121 |
| 8,844,466 B2 | * | 9/2014 | Vermeegen | A01K 5/0114 119/421 |
| 8,899,180 B2 | * | 12/2014 | Lindskov | A01K 5/0114 119/61.1 |
| 8,919,288 B2 | * | 12/2014 | Ressemann | A01K 13/00 119/61.5 |
| D723,759 S | * | 3/2015 | Evans | D32/55 |
| 2002/0185073 A1 | | 12/2002 | Fullerton et al. | |
| 2006/0005774 A1 | * | 1/2006 | Newman Bornhofen | A01K 5/0135 119/61.5 |
| 2006/0213447 A1 | * | 9/2006 | Kitchen | A01K 5/0114 119/61.5 |
| 2006/0231039 A1 | | 10/2006 | Abinanti et al. | |
| 2007/0125725 A1 | * | 6/2007 | Kemper | A47L 19/04 211/41.3 |
| 2007/0272632 A1 | * | 11/2007 | Jerstroem | A47L 19/04 211/41.4 |
| 2008/0053374 A1 | | 3/2008 | Kerrigan et al. | |
| 2009/0126641 A1 | * | 5/2009 | Anderson | A01K 5/0135 119/61.5 |
| 2011/0308470 A1 | * | 12/2011 | Vermeegen | A01K 5/0114 119/51.5 |
| 2012/0167827 A1 | | 7/2012 | Rochon | |
| 2014/0060442 A1 | * | 3/2014 | Ressemann | A01K 13/00 119/61.5 |

FOREIGN PATENT DOCUMENTS

| | | |
|---|---|---|
| GB | 2410409 A | 8/2005 |
| WO | WO 2009029999 A1 | 3/2009 |
| WO | WO2011032285 A1 | 3/2011 |

* cited by examiner

FOOD RETAINER FOR A DOMESTIC ANIMAL

This application is a 371 filing of International Patent Application PCT/DK2013/050109 filed Apr. 17, 2013, which claims the benefit of Danish application no. PA 2012 70199 filed Apr. 18, 2012.

BACKGROUND

The invention relates to a food retainer for food to an animal. The food retainer comprises a base and a number of protrusions extending upwards from the upper surface of the base of the food retainer in distances from each other.

More specifically the invention relates to a food retainer for domestic animals, e.g. dogs. However, the retainer may by used for any desired animal, including wild animals held in captivity in a zoo.

In the context of the present invention the upper surface of the base of the food retainer is considered to be when the food retainer is in position of use, i.e. when the retainer is presenting food to an animal.

Wild animals living in the nature need to struggle and fight in order to supply themselves with sufficient food in order to survive. The often hard life of wild animals will however stimulates the animals intelligence and physique, contributing to keeping them healthy, in good shape and maintaining the best possible position for the animals continued survival.

Domestic animals however lack such challenges since the food usually is served in such way that the animals easy and quickly can consume the food without making any effort. Rapid consumption of food may however be detrimental for the animal, which afterwards often is belching, vomiting and releasing malodorous air from the stomach.

Furthermore, the lack of stimulation may led to lowering the intelligence and physique of domestic animals in comparison with the intelligence and physique of wild animals. The lack of stimulation moreover makes a domestic animal lazy, such that the animal often is sleeping much of the day away, eventually resulting in that the animal's health is suffering.

For avoiding these problems, which are very unpleasant for both the animal and the owner of the animal, feeding dishes equipped with means for motivating the animal to eat in a relatively slow pace have been developed. In this respect the animal is being spared for the often injurious consequences to the health and to the physical well being of the animal of eating too fast, for example by swallowing all the food at once.

As an example of such improved construction can be mentioned the feeding dish known from the patent application WO 2009/029999. Said application discloses a feeding dish comprising a base and a circumferential sidewall extending from the periphery of the base. A number of protrusions in form of cylinders with domed tops are moreover extending upwards from the base in mutual distances from each other. The protrusions are further divided into a first group with one height and a second group with a lower height.

Said protrusions functions as obstructions thereby motivating the animal to eat a slower pace. The animal can however still get hold of the food in an easy and comfortable way, but now only in smaller portions. The known retainer does therefore not offer the animal the same challenges wild animals faces in the nature when they are struggling for their survival.

The known dish does in this respect not stimulate the inherent nature of animals even though the eating process makes up an important part of the life of pets, and the known retainer will neither stimulate the intelligence and physique of domestic animals nor will it keep them healthy and active contrary to the desires of the owners of the animals.

SUMMARY OF THE INVENTION

The above-mentioned disadvantages of the prior art is according to the invention remedied by In a first aspect providing a food retainer of the kind mentioned in the opening paragraph, which offer a domestic animal a similar resistance to catch hold of food placed in the food retainer as wild animals encounter in the nature, in a second aspect of the invention providing a food retainer of the kind mentioned in the opening paragraph, which in an advantageous way is motivating an animal for slowing down the speed of eating, and which is adapted to force the animal to work for getting the food, in a third aspect of the invention providing a food retainer of the kind mentioned in the opening paragraph, which is arranged in such a way that an animal eating of the tray will be more relaxed and behave in a balanced manner, in a forth aspect of the invention providing a food retainer of the kind mentioned in the opening paragraph, which can be used by animals of different buildings and sizes, in a fifth aspect of the invention providing food retainer of the kind mentioned in the opening paragraph, which is hygienic in use and easy to clean and which has a simple and inexpensive structure Other aspects of the invention will be apparent during the course of the following description.

The novel and unique wherein the above-mentioned feature is achieved consists, according to the invention, in the fact that the protrusions are substantially higher than the remainder of the food retainer. The protrusions are therefore the only means serving to keep the food in place in the food retainer in such way that the animal needs to struggle for retrieving and eating the food.

The term "that at least some of the protrusions are substantially higher than the remainder of the food retainer", means within the context of the present application that the base of the food retainer have a relatively small height compared to the height of the protrusions. Preferably at least some of the protrusions are at least three times the height of the base, preferably at least five times the height of the base, and even more preferred at least ten times the height of the base.

As the animal is retrieving said food the animal will not only be self-engaged during retrieval of the food, but the animal will also be rewarded as it retrieves food. The rate of retrieval will depend upon the degree of animal interaction with the food retainer but in any case the pet will be fed at a slower rate than hitherto known.

The retainer according to the invention will therefore ensure that the natural needs of the animal are stimulated with respect to the use of brain, the animals senses and feeding. The animal will hereby be more relaxed and behave in a balanced manner, because it can then use its energy, also when the animal is home alone.

In order to ensure that the animal only is able to retrieve the food meeting obstacles, the protrusions can in a first embodiment be placed all over the base in mutual distances from each other whereby the animal need to scrape and/or push the food outside the food retainer for being eaten on e.g. the floor upon which the retainer is resting.

In another embodiment the protrusions can be placed different distances from each other, as this will ensure that the retainer is even more complex and demanding for the animal.

In still another embodiment according to the invention the protrusions can be placed only in a central area of the base, in this respect it is ensure that the animal advantageously have to struggle to obtain the food placed in the middle of the retainer but easily be able to eat the food directly from the base of the food retainer outside the central area.

An animal desiring to eat therefore need to catch hold of the food by struggling for bringing the food into position for being eaten similar to, that a wild animal need to struggle for the food by hunting and killing another animal.

An animal like a dog is using its tongue, nose and paws to scrape and push food outside the protrusions of the food retainer. That work is laborious and difficult to perform with the result that the animal cannot at the same time bring all the food into position for being eaten. The animal is therefore forced to use time for gradually bringing the food in position for being eaten and to use time too for bit-by-bit eating the food.

That causes the animal to be occupied a large part of the day since an important part of an animal's life is to catch hold of food and to eat it. During the time used for fulfilling that task is the animal not able to sleep and to be lazy.

The struggling for the food stimulates advantageously also the intelligence and physique of the animal and the performed exercise keeps the animal healthy and also active instead of lazy. The retainer according to the invention will therefore provoke a continued and independent animal interest, as the animal continually is interested in being fed, and the retainer will therefore not as conventional animal "toys" be disregarded after a period of use.

According to the invention can the upper surface of the base be planar or slightly concave or slightly convex and a peripheral area of the upper surface of the base can be formed as a continuation of said surface or as an elevation of this. That implies that the food retainer according to the invention is without a continuous sidewall like the sidewall of the dish disclosed in the above-mentioned patent application WO 200902999 for keeping the food within the dish.

The food is in the food retainer according to the invention retained by means of the protrusions. Said protrusions are arranged in such way that the desired degree of difficulty for scraping and pushing the food outside the protrusions of the food retainer by means of the tongue, nose and paws of an animal like a dog is obtained.

Forming some of the protrusions with a larger height than other of the protrusions and placing the highest of them in the centre area of the base can according to the invention serve for adjusting the desired degree of difficulty of scraping and pushing the food.

In order to ensure that it will be laborious and difficult to scrape and push the food into a position where it can be eaten, the retainer according to the invention can be further adjusted by placing protrusions with equal heights in groups along a circumferential curve such as a circle, e.g. in equal or diverse distance from each other, and preferable in such way that the number of protrusions in one group is about the same as in another group.

The width of the paths between the protrusions along which the animal has to scrape and push the food is thereby increased into the direction going from the centre of the food retainer to the periphery of the food retainer so that it becomes more difficult to scrape and push the food along the path the closer the food is placed to the centre of the food retainer.

When the animal is starting to catch hold of food in the food retainer, the animal will relatively easy be able to scrape and push some food into position for being eaten. However, it becomes however increasingly harder to scrape and push food along the paths in the retainer, the farther the animal needs to operate from the periphery of the food retainer for catching hold of more food.

The paths can according to the invention each be running along a straight line thereby giving an animal relatively easy access to food in the food retainer, however in an expedient embodiment according to the invention each path can preferably run along one ore more curves, e.g. zigzag curves so that it will be relatively difficult for the animal to move the food along the paths.

According to the invention the curved paths can be established by letting the protrusions be relatively flat, and place them on the base of the food retainer in such way that they form angles with each other.

In one embodiment according to the invention the protrusions can comprise a central protrusion, which is higher than the remaining protrusions. Said central protrusion can advantageously be used to handle the food retainer, e.g. when the animals owner is cleaning the retainer.

The animal will during the retrieval of the food apply relatively large forces to the retainer, when struggling for retrieving the food. This can in some cases result in damages to the support on which the retainer is resting, e.g. the floor.

For preventing such damages the food retainer can in one embodiment be formed with means adapted to prevent such damages, e.g. means adapted to contact the support upon which the food retainer is resting in position of use and which ensures that the floor does not becomes damages. Said means can e.g. be a layer of felt or a circumferential strip, which is made of an elastic material like rubber. The latter further has the advantages that the friction between the strip and the floor reduces the possibility of that the animal can move the food retainer about on the floor when struggling for retrieving the food.

The possibility that the animal can move the food retainer around can in addition be minimized by furnishing the periphery of the base with an outwards tapering circumferential lip which is made of an elastic material like rubber and is adapted to contact the support upon which the food retainer is resting in position of use, so that the food retainer also becomes a suction disc which can be firmly anchored on the floor.

In an advantageous embodiment according to the invention the retainer can be formed as an integral unit without joints in which food could hide and gradually taint. The retainer then will be hygienic in use and easy to clean.

The retainer is preferably made from a material easy to clean, e.g. a plastic however other kinds of material are contemplated within the scope of the invention. In one embodiment according to the invention, at least the protrusions of the retainer is made from a material which is able to be partly flexible, such that the retainer can be used by both large and small animals.

It therefore is not necessary to market several different sizes of the retainer according to the invention whereby large expenses to tools and production is saved.

BRIEF DESCRIPTION OF THE DRAWINGS

The invention will be explained in greater details below where further advantageous properties and example embodiments are described with reference to the drawings in which.

DETAILED DESCRIPTION OF THE INVENTION

In the following is assumed that the animal is a dog, which is however not shown in the figures just as the food to be eaten of the dog is not shown in the figures, either.

Figure 1:
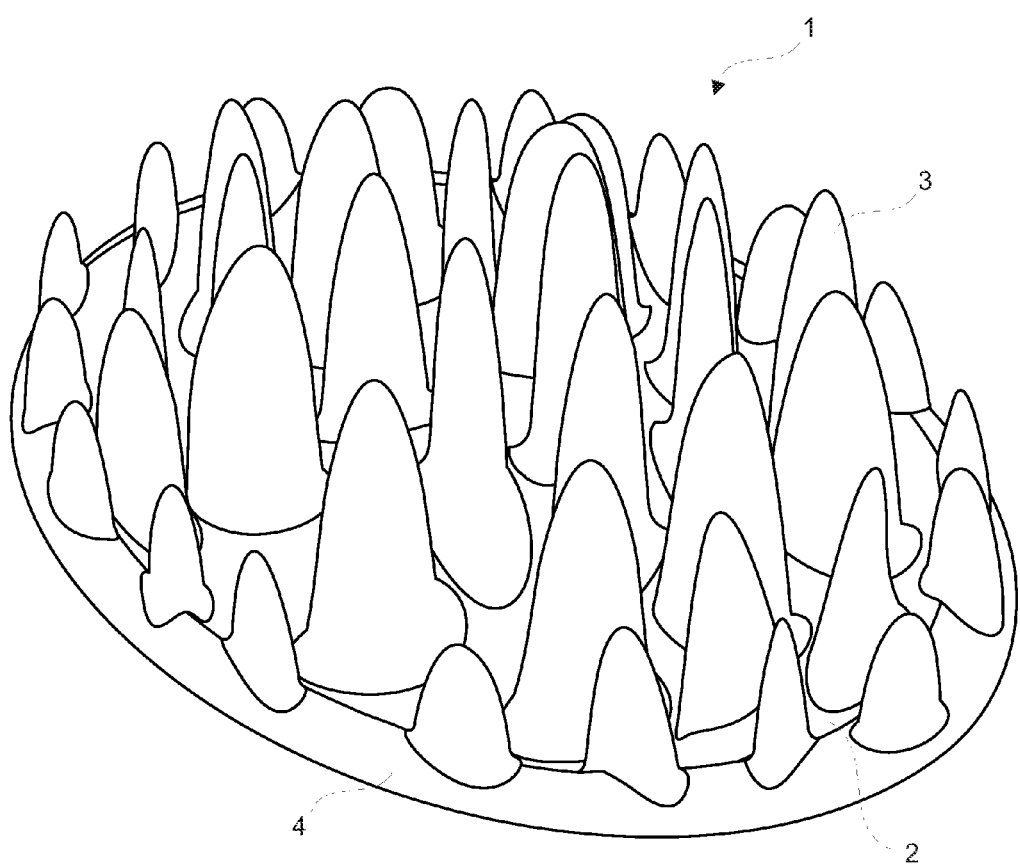
FIG. 1 shows, seen in perspective, a food retainer, according to the invention for food to an animal.

FIG. 1 shows, seen in perspective, one embodiment of a food retainer 1 for food to a dog. The food retainer is placed in position of use upon a support like e.g. a floor, not shown.

The food retainer 1 comprises a base 2 and a number of protrusions 3 extending upwards from the base 2 in distances from each other. In the embodiment shown in FIG. 1 the protrusions are placed in mutual distance from each other, but it must be understood that the protrusions also can be placed with a diverse distance between each other.

The protrusions are, as can be seen, highest at the central area of the base. Along the periphery of the base is moreover formed a low rim 4. The protrusions are higher than the remainder of the food retainer, inclusive said low rim.

The protrusions are arranged in such way on the base 2 that the dog needs to struggle for retrieving some food by scraping and pushing the food into position for being eaten.

The dog therefore needs to use time for gradually moving the food into position for being eaten and to use still more time for gradually eating the food.

That process is healthy for the dog and stimulates its intelligence and physique.

Figure 2:
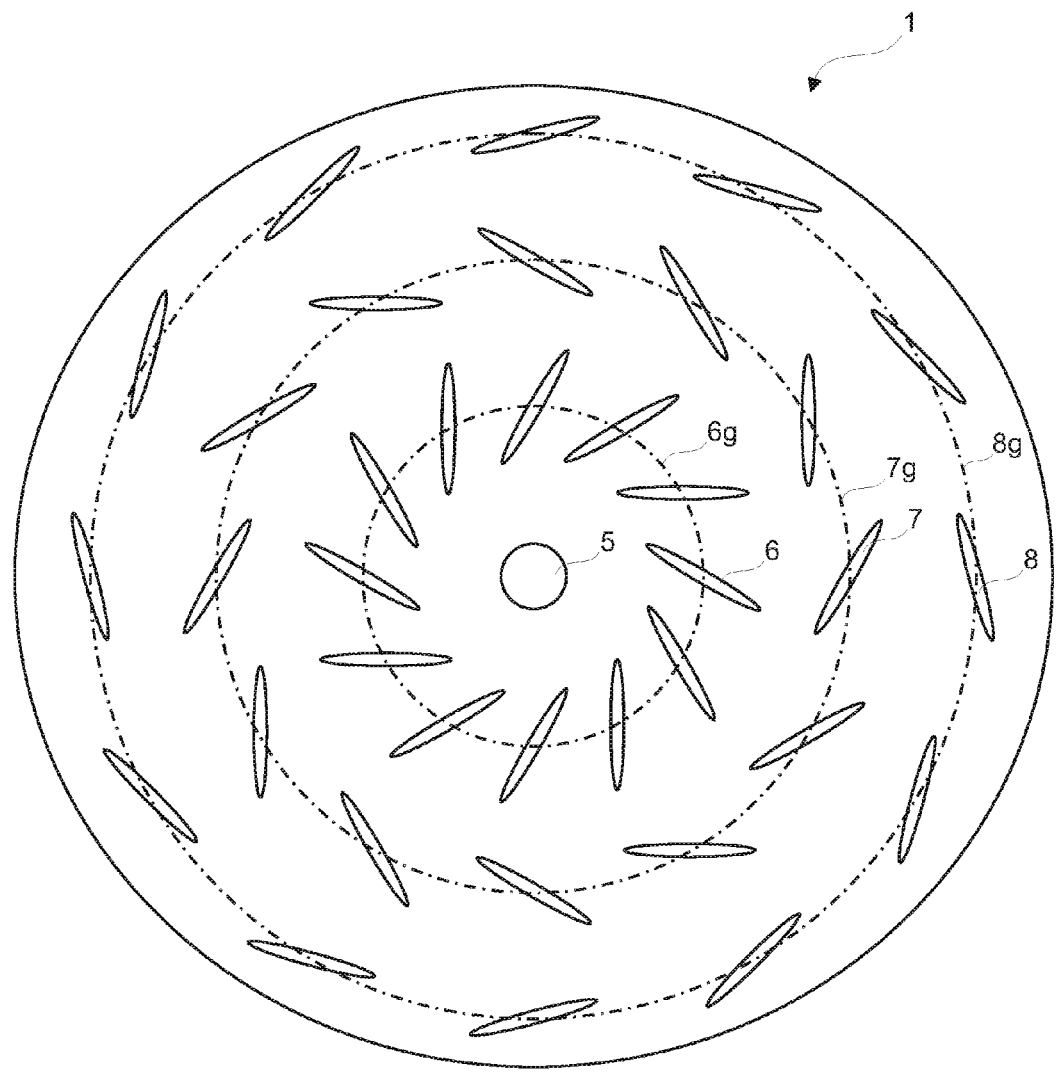
FIG. 2 shows the food retainer, seen from above.

FIG. 2 shows the food retainer, seen from above. The food retainer is in this case round but may within the scope of the invention have any other configurations, for example oval or polygonal. The rim is not shown in FIG. 2.

A central protrusion 5 is formed with a round cross section while each of the remainder of the protrusions in this case are formed with a cross section in form of an ellipse with a major axis and a minor axis. The major axis of the ellipse is substantially larger than its minor axis whereby each of the protrusions becomes relatively flat.

The major axis can for example be between 1-20 times larger than the minor axis, especially between 1-10 times larger.

Figure 3:
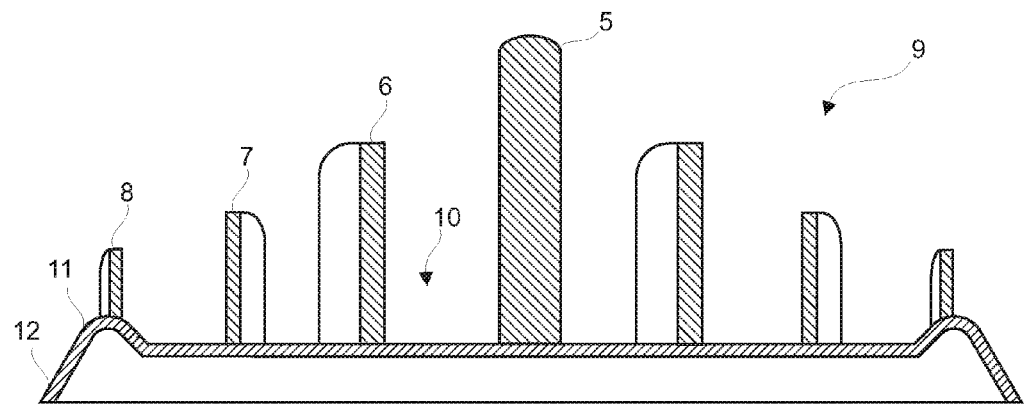
FIG. 3 is a lateral cross section of a first embodiment of the food retainer.
Figure 4:
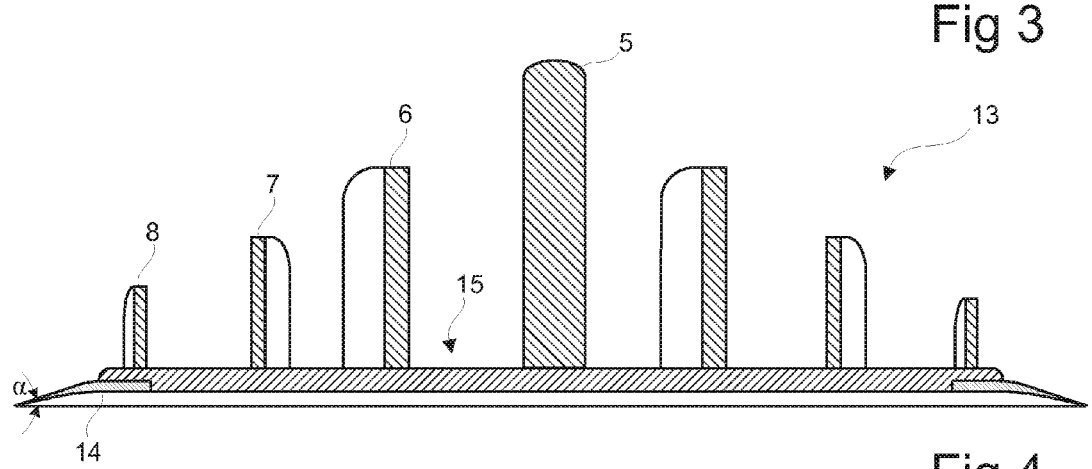
FIG. 4 is a lateral cross section of a second embodiment of the food retainer.

The food retainer shown in FIG. 2 is seen in cross section in FIGS. 3 and 4 showing that the protrusions have different heights. The innermost protrusions 6 are higher than the intervening protrusions 7 which again are higher than the outermost protrusions 8.

Protrusions with equal heights are moreover grouped along circles with equal distances between them. Within the scope of the invention may the protrusions be grouped along other kinds of circumferential curves, for example oval curves.

The innermost and highest protrusions 6 are thus grouped along a first circle 6g, the intervening and second highest protrusions 7 are grouped along a second circle 7g and the outermost and lowest protrusions 8 are grouped along a third circle 8g.

The number of protrusions in the three groups is preferable the same and the protrusions are furthermore forming angles with neighbouring protrusions.

The grouping of the protrusions in the above-mentioned way leaves openings between them, which are forming paths extending from the outside to the centre of the food retainer. The dog has access to the food via these paths.

Owing to the above-described particular arrangement of the protrusions the paths do however not run along a straight line but mostly in zigzag for thereby making it appropriately hard for the dog to catch hold of the food.

FIG. 3 shows a lateral cross section of a first embodiment of a food retainer 9.

The base 10 of the food retainer is in this case planar. Within the scope of the invention may the base however also be concave or convex.

At the periphery is the base formed with a low rim 11 for making it more difficult for the dog to push food outside the food retainer. The rim is merging into a foot 12 for supporting the dish upon e.g. a floor, (not shown).

The projections 5, 6, 7 and 8 are, as can be seen, placed upon the base with distances between them and with decreasing heights into the direction going from the centre to the periphery of the food retainer. For making it easy to effectively cleaning the food retainer the projections are merging into the base in soft transitions, (not seen).

FIG. 4 shows a lateral cross section of a second embodiment of the food retainer 13.

The construction of this second embodiment 13 of the food retainer corresponds substantially to the construction of the above-described first embodiment 9. The second embodiment is however not quipped with a rim and a foot like the first embodiment.

Instead of a foot is the second embodiment 13 of the food retainer in this case furnished with an outward tapering circumferential lip 14 extending along the periphery of the base 15 of the food retainer 13.

The lip 14 forms a relatively little angle $\alpha$ with the base 15 of the food retainer and is made of an elastic material like rubber.

This structure implies that the food retainer 13 functions as a suction disc when being placed upon e.g. an even floor (not shown).

Such a suction disc is able to securely keep the food retainer at a predetermined place on the floor so that it thereby effectively is avoided that a dog struggling for food is making disorder in a location by pushing the food retainer about on the floor.

The central protrusion 5 can advantageously be used for manually pressing the suction disc into suction position on the floor and to lift the suction disc up from this position.

The relatively strong adhesion to the floor of the suction disc being in the suction state can easily be removed by means of a valve (not shown) for releasing the under pressure below the food retainer. The valve cans e.g. be mounted on the central protrusion 5.

The base 15 of the food retainer 13 is stressed by relatively large forces when being in the suction state of the food retainer and is therefore formed with a corresponding larger thickness than the base 10 of the food retainer 9.

Figure 5:
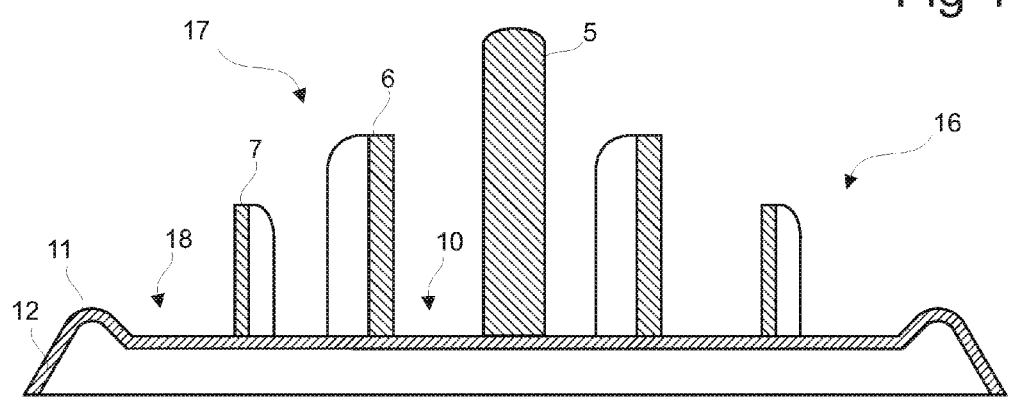
FIG. 5 is a lateral cross section of a third embodiment of the food retainer.

FIG. 5 shows a lateral cross section of a third embodiment of the food retainer 16.

The construction of this third embodiment of the food retainer 16 corresponds substantially to the construction of the above-described first embodiment 9.

The food retainer is however without the outer protrusions 8 and the protrusions 6 and 7 are in this case also grouped in smaller circles 6g and 7g than in the first embodiment 9 so that the they offer the dog a sufficiently large resistant against catching hold of the food placed behind said protrusions.

The above-described structure divides the third embodiment of the food retainer 16 up into a capturing zone 17 placed behind the protrusions 6 and 7 and an eating zone 18 placed between the outer protrusions 7 and the rim 11.

The dog will like a wild animal be forced to fight for catching hold of food retained in the capturing zone 17 keeping the dog in good condition and health. Furthermore, the arrangement of the retainer according to the invention will simultaneously ensure that the animal will eat in a relatively slow pace preventing it from being affected by disagreeable inconveniences such as belching, vomiting and releasing malodorous air from the stomach and at the same time improve the intelligence of the animal. Since animals start to eat as soon as food is available, there is no need for providing a large supply of food in the eating zone 18, and the eating zone can therefore in a preferred embodiment be relatively narrow. This also ensures that the dog is stimulated continuously, when trying to retrieve the food.

This third embodiment of the food retainer 16 has the advantage that food is not placed on the floor but that the dog can eat the food directly from the food retainer in a desirable and hygienic way instead.

Figure 6:
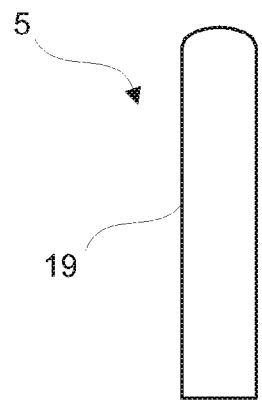
FIG. 6 shows a first embodiment of a protrusion of the food retainer.

FIG. 6 shows the central protrusion 5 seen from the side 19 and from the top 20. The central protrusion, which in this case is formed with a round cross section, can advantageously be used for handling the food retainer of the invention.

Figure 7:
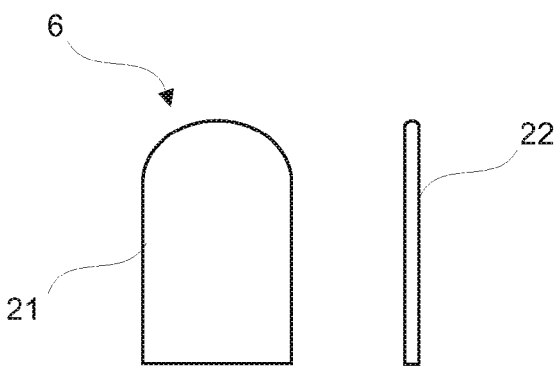
FIG. 7 shows a second embodiment of a protrusion of the food retainer.

FIG. 7 shows one embodiment of the protrusion 6 of the food retainer seen from one side 21, from another side 22 and from the top 23. The protrusion is in this case extending straight upwards from the base.

Figure 8:
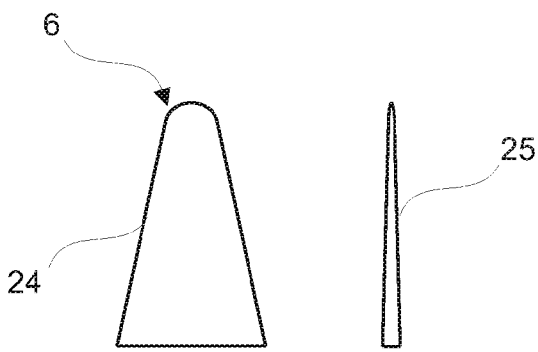
FIG. 8 shows a third embodiment of a protrusion of the food retainer.

FIG. 8 shows another embodiment of the protrusion 6 of the food retainer seen from one side 24, from another side 25 and from the top 26. The protrusion is in this case extending tapering upwards from the base.

The number of protrusions and of groups of protrusions can be the numbers mentioned above but can with in the scope of the invention also be other numbers of protrusions and of groups of protrusions.

The protrusions do not either need to be grouped along circles but can be arranged in any suitable way on the food retainer.

The cross section of a protrusion is above mentioned as being elliptically but can within the scope of the invention be of any other suitable form.

In the FIGS. 3, 4 and 5 are the protrusions shown as separate parts placed upon the base of the food retainer. Preferably are the protrusions however cast integrally with the base of a material like metal, plastic or rubber.

Above is the invention also described based upon the assumption that the user of the food retainer is a dog. Within the scope of the invention may the food retainer however be adapted to be used of other animals like e.g. cats.

What is claimed is:

1. An animal feeding tray for providing food to an animal comprising a base having an upper surface and a number of protrusions extending upwards from the upper surface of the base of the retainer at a distance from each other, and at least some of the protrusions are higher than other protrusions, wherein the protrusions in a central area of the base are highest of all protrusions, and wherein one protrusion tapers from the base towards a free top end.

2. An animal feeding tray according to claim 1, wherein the protrusions are placed all over the base in mutual or diverse distances from each other.

3. An animal feeding tray according to claim 1, wherein the protrusions are placed in a central area of the base.

4. An animal feeding tray according to claim 1, wherein the upper surface of the base is planar or slightly concave or slightly convex.

5. An animal feeding tray according to claim 1, wherein a peripheral area of the base is formed as a rim.

6. An animal feeding tray according to claim 1, wherein the periphery of the food retainer is round, oval or polygonal.

7. An animal feeding tray according to claim 1, wherein the protrusions include groups that include a plurality of protrusions of equal heights with the protrusions in each group extending along a curve and spaced in equal distances from each other, with the number of protrusions in each group being about the same.

8. An animal feeding tray for providing food to an animal comprising a base having an upper surface and a number of protrusions extending upwards from the upper surface of the base of the retainer spaced at a distance from each other, and at least some of the protrusions are higher than other protrusions, wherein the protrusions in a central area of the base are highest of all protrusions, wherein the cross sections parallel with the upper surface of the base of at least some of the protrusions are formed each as mainly an ellipse having a major axis and a minor axis, whereby the major axis of the ellipses are substantially larger than the minor axis.

9. An animal feeding tray according to claim 8, wherein the major axis is between 1-20 times larger than the minor axis.

10. An animal feeding tray according to claim 8 wherein the major axis of the ellipse of each protrusions forms an angle with the major axis of the ellipses of a neighbouring protrusion.

11. An animal feeding tray for providing food to an animal comprising a base having an upper surface and a number of protrusions extending upwards from the upper surface of the base of the retainer spaced at a distance from each other, and at least some of the protrusions are higher than other protrusions, wherein the protrusions in a central area of the base are highest of all protrusions, wherein at least some of the protrusions are formed each with upright or sloping sides merging into a domed top.

12. An animal feeding tray according to claim 11, wherein the at least some protrusions are formed with sloping sides merging into the domed top.

13. An animal feeding tray according to claim 11, wherein the central protrusions include one protrusion which is higher than the other central protrusions.

14. An animal feeding tray according to claim 1, wherein the retainer is formed without any sidewall extending upwards from the base of the retainer.

15. An animal feeding tray for providing food to an animal comprising a base having an upper surface and a number of protrusions extending upwards from the upper surface of the base of the retainer spaced at a distance from each other, and at least some of the protrusions are higher than other protrusions, wherein the protrusions in a central area of the base are highest of all protrusions, wherein the base has a periphery furnished with an outwards tapering circumferential lip which is made of an elastic material and which is adapted to contact the support upon which the food retainer is resting in the position of use.

* * * * *